United States Patent [19]
Beitler

[11] Patent Number: 4,578,724
[45] Date of Patent: Mar. 25, 1986

[54] TAPE CASSETTE HOLDER WITH RELEASABLE REEL HOLD-DOWN

[75] Inventor: Franz Beitler, Vienna, Austria

[73] Assignee: U.S. Philips Corporation, New York, N.Y.

[21] Appl. No.: 443,511

[22] Filed: Nov. 22, 1982

[30] Foreign Application Priority Data

Jun. 11, 1982 [AT] Austria .................................. 2281/82

[51] Int. Cl.⁴ ..................... G11B 15/66; G11B 23/04
[52] U.S. Cl. ......................................... 360/85; 360/93
[58] Field of Search .................................. 360/95–96.3, 360/96.5, 96.6, 93, 132, 85; 242/196, 198–200

[56] References Cited

U.S. PATENT DOCUMENTS 4,101,944  7/1978  Inoue ...................................... 360/95
4,234,140  11/1980  Van Nie .............................. 242/199

*Primary Examiner*—S. J. Heinz
*Attorney, Agent, or Firm*—David R. Treacy

[57] ABSTRACT

A recording and/or reproducing apparatus for a record carrier in the form of a tape contained in a cassette, which comprises at least one reel hub for taking up said record carrier which reel hub is axially accessible from opposite sides, is provided with a cassette holder which is movable between a loading position and an operating position. The cassette holder comprises a carrying member for a reel-hub hold-down means, which member is movable between a rest position and an operating position and for moving the carrying member there is provided at least one actuating member which projects into the path along which the cassette is inserted into the cassette holder. Upon insertion of the cassette the cassette drives the actuating member and this member moves the carrying member, out of its rest position, when the cassette holder is already in its loading position in which rest position the reel hub hold-down means is disposed outside the insertion path of the cassette, into its operating position, in which the reel-hub hold-down means engages the reel hub. When the cassette holder is in its operating position and the cassette is in its operating position the reel-hub hold-down means ensures that the reel hub is kept in a predetermined position relative to the winding mandrel (FIG. 4).

18 Claims, 9 Drawing Figures

TAPE CASSETTE HOLDER WITH RELEASABLE REEL HOLD-DOWN

The invention relates to a recording and/or reproducing apparatus for a record carrier in the form of a tape contained in a cassette, which comprises at least one rotatable reel hub for taking up said record carrier, which reel hub is axially accessible through each of the two mutually parallel major walls of the cassette, which apparatus comprises a cassette holder which is movable between a loading position, in which the cassette, when its major walls extend parallel to a predetermined insertion path, can be inserted into said holder along said insertion path, and an operating position, in which the inserted cassette occupies an operating position in the apparatus and cooperates with the reel hub by means of a rotatable winding mandrel on the apparatus through the cassette major-wall which faces said mandrel, which holder comprises a reel-hub hold-down means which is arranged on a carrying member which is disposed on the cassette holder and which comprises a portion carrying the reel-hub hold-down means and extending substantially parallel to the major walls of the inserted cassette, which means can be made to cooperate with the reel hub through the cassette major-wall which is remote from the winding mandrel and holds the reel hub in a predetermined position relative to the winding mandrel when the cassette is in its operating position.

Such apparatus is known, for example from Austrian Pat. No. 365,367, to which U.S. Pat. No. 4,234,140 corresponds.

In the known apparatus, which is intended for cooperation with a cassette comprising two adjacent reel hubs the reel-hub hold-down means, which can be made to cooperate with the two reel hubs, are arranged on a cassette-holder top wall which extends parallel to the major walls of the inserted cassette and extend through this top wall into the cassette-holder compartment. The distance between the reel-hub hold-down means which extend through this cassette-holder wall and a facing bottom wall of the cassette holder is such that the cassette can be inserted into or removed from the cassette holder with its two major walls sliding along the bottom wall without the cassette coming into contact with the reel-hub hold-down means which extend through this top wall, thereby ensuring an unimpeded insertion and removal of the cassette and precluding damage to the reel-hub hold-down means during insertion and removal of the cassette. This means that in this case the distance between the top wall carrying the reel-hub hold-down means and the bottom wall of the cassette holder is greater than strictly necessary for receiving the cassette. As a result of such an overdimensioning the cassette holder occupies more space in the apparatus. Moreover, in the known apparatus the reel-hub hold-down means do not co-operate with the reel hubs until the cassette is in its operating position. This is effected in such a way that during the movement of the cassette holder from its loading position into its operating position the cassette already butts against locating stops on the apparatus before the operating position is reached and is positioned and retained in its operating position by these stops and during the subsequent movement of the cassette, which is in its operating position, relative to the cassette holder, which is moved further into its operating position, the reel-hub hold-down means on the cassette holder are moved towards the reel hubs in the cassette and finally enter into co-operation with these reel hubs. This relative movement necessitates an actuating movement in addition to the actuating movement of the cassette holder for bringing the cassette into its operating position, which also demands additional space in the apparatus. Both the larger dimensions of the cassette holder and the additional actuating movement of said holder demand a comparatively large space in the apparatus, which is in conflict with a compact construction of the apparatus.

It is the object of the invention to improve an apparatus of the type mentioned in the opening paragraph so as to solve the two aforementioned problems in a simple manner. To this end the invention is characterized in that the carrying member with its portion carrying the reel-hub hold-down means is arranged on the cassette holder so as to be movable, at least transversely of the major walls of the inserted cassette, between a rest position, in which the reel-hub hold-down means is disposed outside the insertion path of the cassette, and an operating position, in which the reel-hub hold-down means is disposed near the reel hub, and for moving the carrying member the cassette holder is provided with at least one actuating member which is movable relative said holder and which projects into the insertion path of the cassette, such that during insertion of the cassette the cassette moves the actuating member against the force of a return spring and said actuating member sets the carrying member from its rest position to its operating position, the reel-hub hold-down means already being disposed near the reel hub when the cassette holder is in its loading position. In this way the reel-hub hold-down means can simply be moved out of the insertion path of the cassette and consequently does not project into the cassette-holder compartment during insertion of the cassette, so that this holder can be very compact. This has the advantage that the cassette holder equipped with a reel-hub hold-down means can be small, so that it occupies only a minimal space. Moreover, it is achieved in a simple manner that the reel-hub hold-down means is already moved towards the reel-hub in the cassette during insertion of the cassette into the cassette holder which is then in its loading position, so that during the movement of the cassette holder from its loading position into its operating position no additional actuating movement is required in order to obtain a relative movement, as in the known apparatus, between the cassette, which is in its operating position, and the cassette holder in order to move the reel-hub hold-down means towards the reel hub, which has the advantage that a comparatively small actuating movement for the cassette holder is obtained and the space needed for this movement is comparatively small. Thus, the space required for the cassette holder is reduced in two different ways, which leads to a substantial reduction of the overall dimensions of such apparatus.

It is to be noted that from German Pat. No. 19 27 531 an apparatus is known which also comprises a reel-hub hold-down means which can co-operate with a reel hub in a cassette. However, this apparatus is not an apparatus of the type mentioned in the opening paragraph, because it does not comprise a cassette holder which is movable between a loading position and an operating position, but a stationary cassette receptacle comprising three abutment points. The reel-hub hold-down means is not arranged on a movable cassette holder but it is mounted coaxially in the winding mandrel of the apparatus and enters into co-operation with the reel hub when the cassette assumes its operating position. Such a construction is very intricate because the reel hub hold-down means is mounted so as to be movable inside the winding mandrel. Therefore the construction in accordance with the present invention is substantially simpler, more stable and more compact.

It is found to be advantageous if the actuating member comprises a slide which is arranged on the cassette holder so as to be movable in the direction of the insertion-path of the cassette, which slide is subject to the action of the return spring and which comprises an actuating surface which is adapted to co-operate in a force-sustained manner with a complementary surface on the carrying member and which is spaced from the complementary surface when the carrying member is in its rest position, the actuating surface abutting with the complementary stop upon insertion of the cassette after a first partial travel of the slide which is moved by the cassette and subsequently, as the slide moves further, sets the carrying member from its rest position to its operating position via the complementary surface. Since the slide can move only in the direction of the insertion path, no relative movement occurs between the cassette and the slide when the cassette is inserted or removed along this insertion path, which is advantageous for a correct cooperation. As the distance between the actuating surface of the slide and the complementary surface of the carrying member corresponds to the first partial travel when the carrying member is in its rest position it is achieved that during removal of the cassette from the cassette holder, after the carrying member has already reached its rest position, the return spring moves the slide over a further distance corresponding to the first partial travel, as a result of which the cassette is ejected from the cassette holder. This is particularly advantageous, because a cassette which projects comparatively far from the cassette holder can readily be removed from the apparatus.

In order to preclude incorrect operation, it is found to be advantageous if the slide comprises a stop surface which extends in the direction of the insertion path of the cassette and the carrying member comprises a latching stop which extends transversely of the stop surface, which latching stop is disposed opposite the stop surface when the carrying member is in its rest position and thereby blocks a movement of the carrying member to its operating position, the stop surface releasing the latching stop on the carrying member upon insertion of the cassette after the first partial travel of the slide to allow said member to be moved from its rest position to its operating position. This ensures in particularly simple manner that the carrying member can be moved from its rest position to its operating position only upon insertion of a cassette into the cassette holder and the reel-hub hold-down means cannot be moved inadvertently into the insertion path of the cassette, thereby precluding damage to the cassette and the apparatus.

In order to move the carrying member from its operating position to its rest position during removal of the cassette from the cassette holder there may be provided a separate actuating spring which acts on the carrying member. It is found to be advantageous if the slide comprises a return engagement surface which extends transversely of the direction of the insertion path of the cassette and the carrying member comprises a return portion which extends transversely of the return engagement surface, which return portion is kept in engagement with the return engagement surface by the return spring which acts on the carrying member, to move said member from its operating position to its rest position, when the return spring moves the slide in a direction opposite to the direction of the insertion path and the carrying member is outside its rest position during removal of the cassette from the cassette holder, and which return portion when the carrying member has reached the rest position releases the return engagement surface to permit the slide to be moved further by the return spring so as to allow the cassette to be removed from the cassette holder. Thus, it is simply achieved that when the cassette is removed from the cassette holder the slide, which is moved in a direction opposite to the direction of the insertion path of the cassette by the return spring, also moves the carrying member from its operating position to its rest position and that the carrying member does not allow the slide to move the cassette further out of the cassette holder until the carrying member has assumed its rest position.

Moreover, it is found to be advantageous of both the latching stop and the return portion are arranged on a projection of the carrying member, and the stop surface and the return engagement surface are formed by two end faces of a plate shaped slide, which end faces extend substantially perpendicular to each other. This results in a particularly simple and compact construction.

It is also found to be advantageous if the actuating member and the carrying member are combined to form a single component. This results in a particularly simple construction. The component may be a lever or a slide.

Moreover, it is found to be advantageous if there is provided at least one latching device which can be released by actuation of a release element, which after the carrying member has moved from its rest position to its operating position during insertion of the cassette at least retains the actuating member, which is moved along during insertion of the cassette, in its actuated position against the force of the return spring and which after it has been released allows the carrying member to be moved to its rest position and the actuating member to be moved by the return spring so as to permit the cassette to be removed from the cassette holder. Thus, it is simply achieved that the latching device takes up the force of the return spring when the cassette holder contains a cassette, so that the cassette is not loaded by the return spring and after it has been moved into the operating position can be positioned accurately without being loaded and impeded by the return spring.

The latching device may, for example, act between the cassette holder and the actuating member. It is found to be particularly advantageous if the latching device acts on the carrying member and retains this member in its operating position, the actuating member being retained in its actuated position against the force of the return spring via the carrying member which is retained in its operating position by the latching device. Thus, it is achieved in a particularly simple manner that the latching device not only takes up the force of the return spring, but in addition ensures that the carrying member is retained in its operating position. This ensures that the reel-hub hold-down means arranged on the carrying member always co-operates with the reel hub in a reliable and correct manner.

For the construction of the carrying member it is found to be advantageous if the carrying member comprises an angular lever which is pivotable about a pivotal axis which extends parallel to the major walls of the inserted cassette, one lever arm which extends substantially parallel to the major walls of the inserted cassette carrying the reel-hub hold-down means and the angular lever with its arm carrying the reel-hub hold-down means being movable substantially transversely of the major walls of the inserted cassette by the actuating member via the other lever arm. In this way the carrying member can be constructed and mounted on the cassette holder in a simple manner.

However, it is also found to be advantageous if the carrying member comprises a bracket which is U-shaped viewed along the insertion path of the cassette, which has a transverse wall which extends substantially parallel to the major walls of the inserted cassette and carries the reel-hub hold-down means, and which is mounted on the cassette holder so as to be movable at least transversely of the major walls of the inserted cassette with its two side walls which are perpendicular to the transverse wall. This results in a very stable construction for the carrying member.

The bracket may be pivotally mounted on the cassette holder, for example, by means of a spindle. However, it is found to be advantageous if for mounting the bracket on the cassette holder so as to be movable a link-motion device is arranged between said holder and each side wall of the bracket, which device comprises at least one link-motion surface having a portion which is inclined relative to the insertion path of the cassette, which surface additionally moves the bracket relative to the cassette holder in the direction of the insertion path of cassette. Thus, it is achieved in a simple manner that the carrying member performs a translational actuating movement which is directed towards the cassette, so that the reel-hub hold-down means carried by the carrying member is always moved correctly and smoothly towards the reel hub in the cassette.

In this respect it is found to be advantageous if, when the bracket, which serves as carrying member, is moved further out of its operating position in the direction of the insertion path of the cassette, the latching device can be released automatically by a further movement of the cassette, which now forms the release element, in the direction of the insertion path. In this way operation is simple because the latching device can be released by manually moving the cassette, which now forms the release element, slightly in the direction of the insertion path, so that no separate release element for releasing the latching device is required, which also simplifies the construction.

For such automatically releasing latching devices several constructions are known, for example controllable switching pawls, such as the so-called shadow pawls. However, it is also found to be advantageous if the latching device comprises a latching pin which is movable transversely of the direction of the insertion path of the cassette, which pin projects into a closed substantially heart-shaped link-motion groove, which during insertion of the cassette and the resulting movement of the bracket in the direction of the insertion path guides the latching pin from an initial position in a link-motion path at the location of the heart apex to a latched position in the link-motion path near the heart indentation, in which latched position the latching pin, via the link-motion path, at least retains the actuating member, which has been moved along during insertion of the cassette, in its actuated position against the force of the return spring and out of which the latching pin can be moved via the link-motion path in order to release the latching device when the bracket is moved further out of its operating position in the direction of the insertion path of the cassette, the link-motion path guiding the latching pin, which has been moved out of its latched position, back to its initial position after the latching device has been released upon the movement of the bracket in a direction opposite the direction of the insertion path by the return spring. Such a latching device, which is also known per se, operates in a reliable manner, whilst its construction is simple and compact.

As is known, there are cassettes which comprise a cassette closure which can be moved against the force of a closing spring upon insertion of the cassette into the cassette holder. Such a cassette is known, for example from the previously mentioned AT-PS No. 365,367. In an apparatus in accordance with the invention which is adapted to co-operate with such a cassette it is found to be advantageous if on the movable carrying member for the reel-hub hold-down means there is also arranged a retaining device for retaining the cassette which has been inserted into the cassette holder, which is in its loading position, and which is urged in a direction opposite to the direction of the insertion path by the closing spring. In this way the cassette, which is urged in a direction out of the cassette holder by the closing spring, is retained in the cassette holder when the carrying member is in its operating position, thereby also preventing the closing spring from inadvertently urging the cassette against the reel-hub hold-down means which have already been moved towards the reel hub, which could impair the operation of said means and even damage said means. Since the retaining device is arranged on the carrying member for the reel-hub hold-down means a simple construction is obtained, the reel-hub hold-down means being moved towards the reel hub and the retaining device towards the cassette in a single operation.

In this respect it is found to be advantageous if the retaining device comprises at least one pin which is secured to the carrying member and which extends perpendicularly to the major walls of the inserted cassette, which pin co-operates with the cassette when the carrying member is moved from its rest position into its operating position.

Two embodiments of the invention will now be described in more detail, by way of example, with reference to the drawing.

Figure 1:
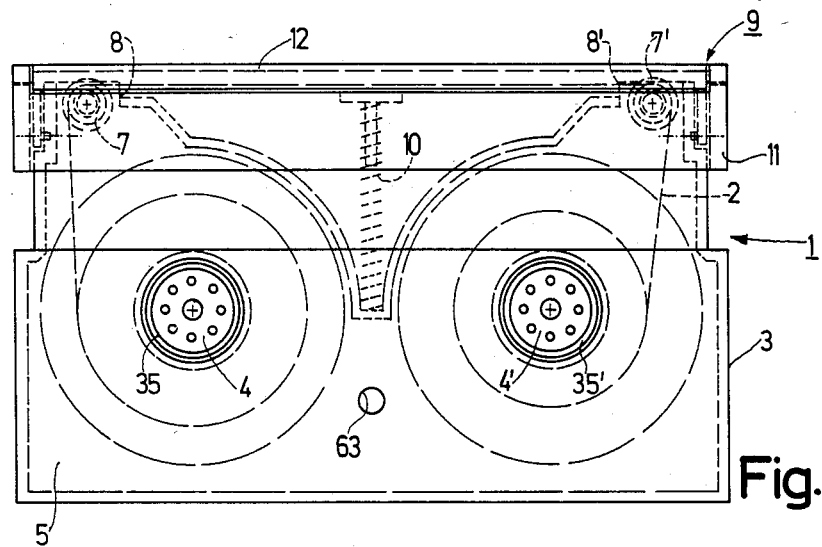
FIG. 1 is a schematic plan view of a cassette comprising two adjacent reel hubs and a cassette closure which can be moved out of the closed position, which is shown, against the force of a closing spring.
Figure 2:
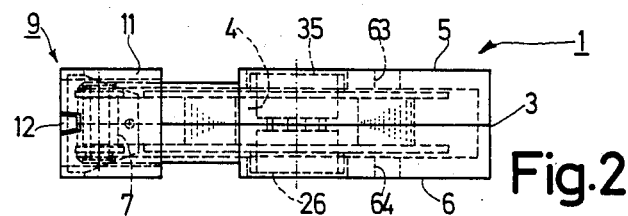
FIG. 2 is a schematic side view of the cassette shown in FIG. 1.
Figure 3:
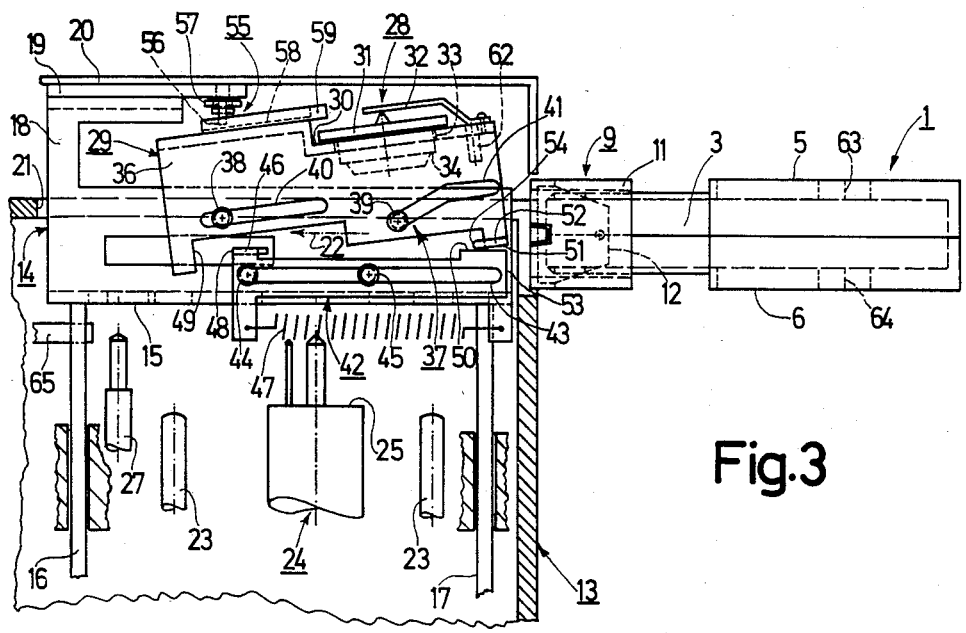

FIG. 3 is a partly sectional side view of a first embodiment of a recording and/or reproducing apparatus for a cassette as shown in FIGS. 1 and 2, which apparatus comprises a movable cassette holder provided with a carrying member for two reel-hub hold-down means, which member is formed by U-shaped bracket, the cassette holder being shown in its loading position and the bracket being shown in its rest position with the cassette outside the cassette holder.

Figure 4:
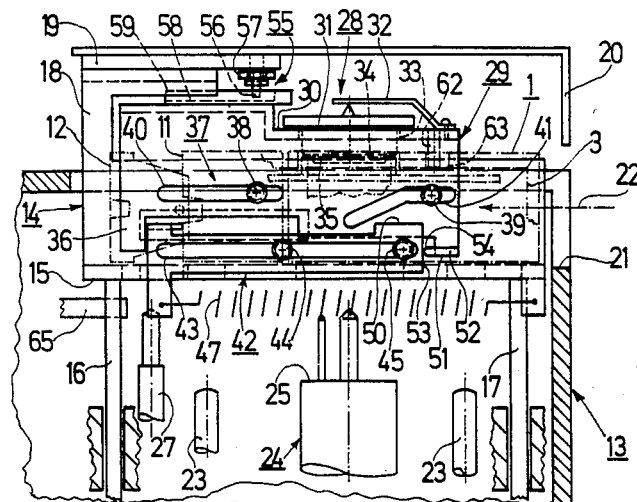

FIG. 4 is a similar view of the apparatus shown in FIG. 3, the cassette being inserted into the cassette holder which in its loading position and the U-shaped bracket being shown in its operating position.

Figure 5:
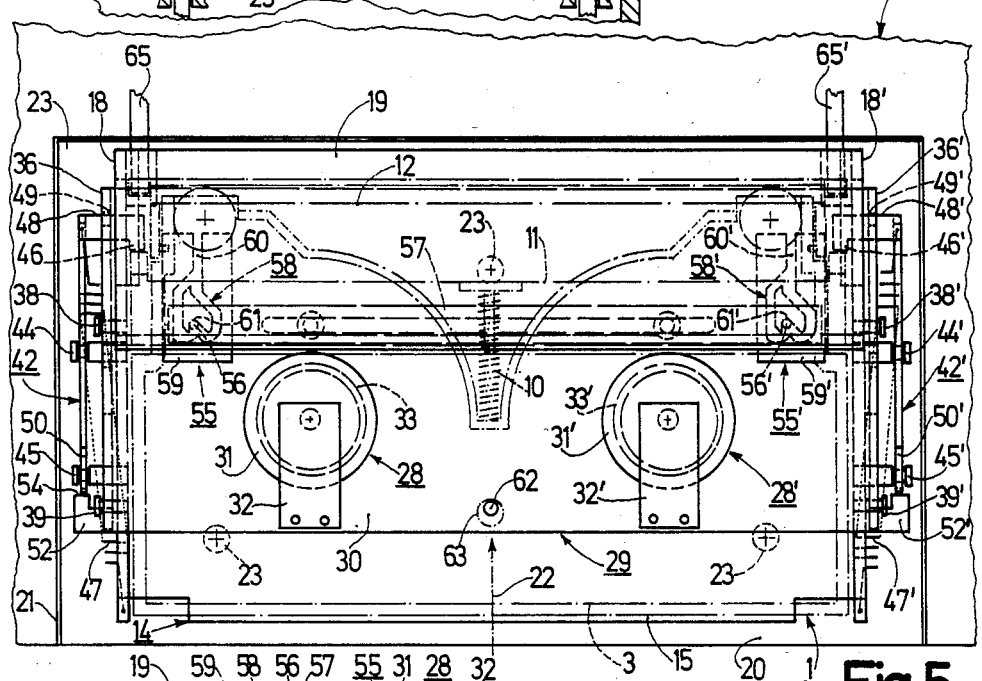

FIG. 5 is a plan view of the apparatus shown in FIG. 4.

Figure 6:
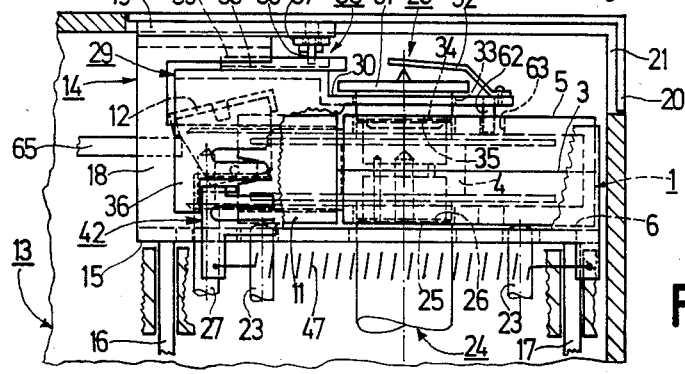

FIG. 6 shows the apparatus in similar view as FIGS. 3 and 4, the cassette holder being in its operating position.

Figure 7:
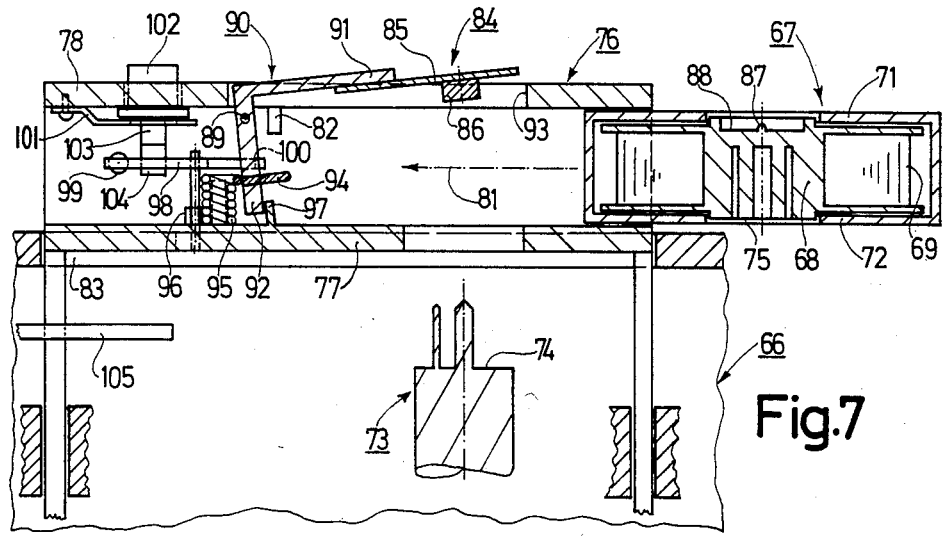

FIG. 7 is a schematic sectional view of a second embodiment of a recording and/or reproducing apparatus for a cassette comprising only one reel hub, which apparatus comprises a movable cassette holder which is shown in its loading position, which is provided with a movable carrying member for a reel-hub hold down means, which member is formed by an angular lever which occupies its rest position when the cassette is outside the cassette holder.

Figure 8:
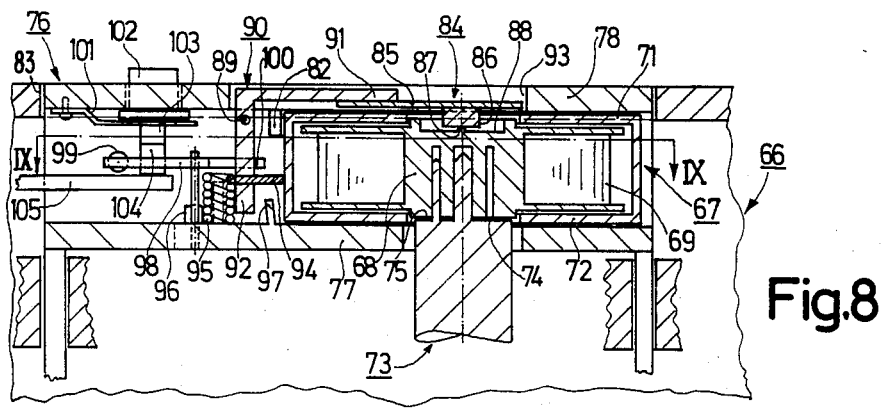

FIG. 8 is a similar view of the apparatus shown in FIG. 7, the cassette holder which contains a cassette being in its operating position and the angular lever in its operating position.

Figure 9:
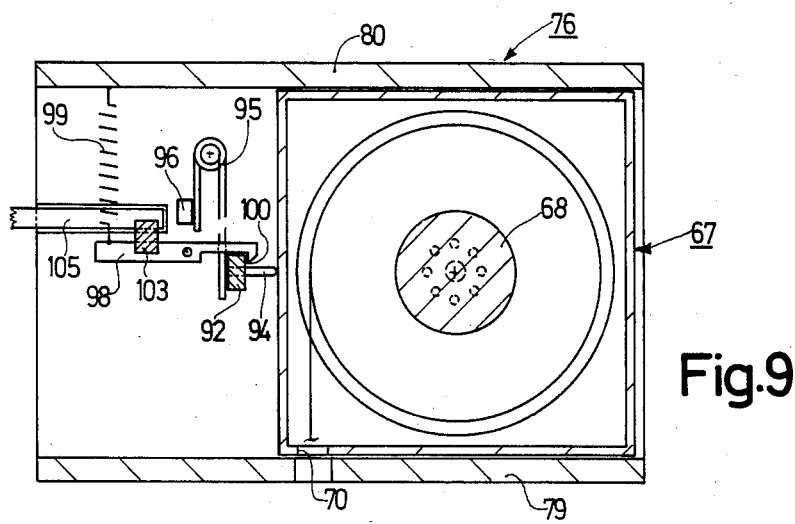

FIG. 9 is a sectional view of the cassette holder of this apparatus, taken on the line IX—IX in FIG. 8.

FIGS. 1 and 2 show a cassette 1 which, for taking up a record carrier 2 in the form of a tape, comprises two adjacent rotatable reel hubs 4 and 4' in the cassette housing 3, which reel hubs are provided with flanges so as to form reels. The reel hubs 4 and 4' are accessible from opposite axial sides via the two parallel major walls 5 and 6 of the cassette 1, for which purpose each major wall has openings which are concentric with the reel hubs. The cassette is constructed as a reversible cassette, so that the cassette can be used in two positions which are inverted relative to each other.

Inside the cassette 1 the record carrier 2 is led from one reel hub 4 along a first guide roller 7 out of the cassette housing 3 from this roller through a first opening 8 in this housing, back into the housing to a second guide roller 7' through a second opening 8' and from this guide roller to the other reel hub 4'. In order to protect the span of the record carrier 2 which is disposed outside the cassette housing 3, the cassette 1 comprises a movable two-part cassette-closure 9 comprising a closing slide 11 which is mounted on the cassette housing 3 so as to be movable from a closed position, shown in FIGS. 1 and 2, to an open position against the force of the closing spring 10 and a closing flap 12 which is pivotally mounted on the cassette housing 3. When the closing slide 11 is in its closed position the flap 12 is also kept in a closed position, from which the flap 12, when the slide 11 has been moved to its open position, can be pivoted in opposite directions into two open positions said span of the record carrier 2 is exposed. When the cassette closure 9 is open and the cassette 1 is inserted into a suitable recording and/or reproducing apparatus the span of the record carrier 2 which extends outside the cassette housing 3 can be made to co-operate with scanning elements in the apparatus for scanning said record carrier for the purpose of recording and/or reproducing signals. Preferably, this is effected by withdrawing the record carrier from the cassette and passing it around the scanning elements; however, alternatively the scanning elements may be introduced into the open cassette. It is to be noted that such a cassette is known and is described, for example, in the aforementioned AT-PS No. 365,367.

FIGS. 3 to 6 show a recording and/or reproducing apparatus 13 which is adapted to co-operate with a cassette 1 as shown in FIGS. 1 and 2. For receiving the cassette 1 the apparatus 13 comprises a cassette holder 14 which is movable between a loading position, shown in FIGS. 3, 4 and 5, and an operating position, shown in FIG. 6. In principle the cassette holder 14 is constructed as U-shaped through and is guided so as to be movable perpendicularly to the bottom wall 15 between the loading position and the operating position by means of guide strips 16 and 17 arranged on the bottom wall 15 of the holder. Since it is irrelevant for the present invention how the cassette holder is moved, this is not shown for the sake of simplicity; the movement may for example be obtained by a motor drive with the aid of a separate actuating motor for the cassette holder, but of course manual actuation is also possible. At their free ends the side walls 18 and 18' of the cassette holder taper towards each other and at this location they carry a strip 19 on which a transparent cover 20 for the cassette holder 14 is arranged. The cover 20 is constructed so that it covers the cassette holder 14 and, when the cassette holder is in its operating position, it closes an opening 21 in the apparatus, through which opening the cassette holder moves between its loading position and its operating position, as can be seen in FIG. 6.

When the cassette holder 14 is in its loading position the cassette 1, whose major walls 5 and 6 extend parallel to a predetermined insertion path, can be inserted into said holder along this insertion path, the cassette sliding along the bottom wall 15 of the cassette holder 14 and being guided by the side walls 18, 18' of this holder. In FIGS. 3, 4 and 5 this insertion path is indicated by a dash-dot arrow 22 for the schematically shown cassette. After complete insertion of the cassette into the cassette holder 14 this holder is brought from the loading position shown in FIGS. 3, 4 and 5 into the operating position shown in FIG. 6 by a suitable movement. During this movement of the cassette holder to its operating position three locating stops 23 for the cassette 1 enter into co-operation with the cassette through openings in the bottom wall 15 of the holder and, when the cassette holder is in its operating position, they retain the cassette 1 in an operating position in the apparatus, in which position the cassette 1 is slightly lifted off the bottom wall 15 of the cassette holder 14, as can be seen in FIG. 6. During this movement of the cassette holder two rotatable winding mandrels 24 and 24' on the apparatus also pass through two further openings in the bottom wall 15 of the holder and through the major wall 6 of the cassette 1 which faces said mandrels to cooperate with the reel hubs 4 and 4' for driving the reel hubs 4. 4'. As is shown in FIG. 6 abutment surfaces 25, 25' of the winding mandrels 24, 24' then abut with end faces 26, 26' of the reel hubs 4, 4', which end faces are disposed near the major wall 6, and thereby define the positions of the winding hubs in their axial directions. Furthermore, during the movement of the cassette holder 14 to its operating position locating pins 27, 27' on the apparatus enter into cooperation with the guide rollers 7 and 7' in the cassette through further openings in the bottom wall 15 in order to achieve accurately defined position of the guide rollers 7 and 7' relative to the apparatus; for the sake of clarity this is not shown in FIG. 6. In this respect it is to be noted that the cassette holder may be provided with at least one cassette hold-down means, which urges the cassette against the bottom wall of the cassette holder when said holder is in its loading position and which urges the cassette against the locating stops 23 when the cassette holder is in its operating position in order to define the operating position of the cassette. In known manner, the cassette hold-down means may comprise a suitable plate spring or a spring-loaded lever which is pivotally mounted on the cassette holder. However, for the simplicity and clarity of the drawings no such cassette hold-down means is shown.

In order to ensure that when the cassette 1 is in its operating position the end faces 26, 26' of the reel hubs 4, 4', which end faces are disposed near the major wall 6, are kept in engagement with the abutment surfaces 25, 25' of the winding mandrels 24, 24', so that the reel hubs always occupy a predetermined position relative to the winding mandrels which is essential for a correct and uniform winding of the record carrier 2 onto or from the reel hubs, two reel-hub hold-down means 28 and 28' are arranged on the cassette holder 14, which means can cooperate with the reel hubs 4, 4' through the major wall 5 of the cassette 1 which is remote from the winding mandrels 24, 24'. The two reel-hub hold-down means 28, 28' are arranged on a carrying member disposed on the cassette holder 14, a portion of said carrying member which carries the reel-hub hold-down means extending substantially parallel to the major walls 5 and 6 of the inserted cassette 1 and being movable at least transversely of the major walls. The carrying member comprises a bracket 29 which is U-shaped viewed in the direction of the insertion path 22 of the cassette 1. The stepped transverse wall 30 of the bracket 29 extends substantially parallel to the major walls 5 and 6 of the cassette 1 and carries the two reel-hub hold-down means 28, 28'. The reel-hub hold-down means each comprise a rotationally symmetrical cap 31, 31', which are retained on the bracket 29 by plate springs 32, 32' and which extend through bores 33, 33' in the wall 30 of the bracket 29, to permit their free ends which comprise abutment surfaces 34, 34' to co-operate with those end faces 35, 35' of the reel hubs 4, 4' which are disposed near the major wall 5.

With its two side walls 36, 36' which are perpendicular to the wall 30 the bracket 29 is mounted on the cassette holder so as to be movable at least transversely of the major walls 5 and 6 of the cassette which has been inserted into the cassette holder. The bracket 29 is mounted on the cassette holder so as to the movable between a rest position, shown in FIG. 3, in which the reel-hub hold-down means 28, 28' are disposed outside the insertion path of the cassette, so that they cannot be damaged when the cassette is inserted and do not impede insertion of the cassette, and an operating positon, shown in FIGS. 4, 5 and 6, in which the reel-hub hold-down means have been moved towards the reel hub. The bracket 29 is mounted on the cassette holder 15 by means of a link-motion device 37, 37' arranged between the cassette holder and each side wall 36, 36' of the bracket 29. Each link-motion device comprises two rollers 38, 38' and 39, 39' respectively, which are rotatably mounted on the side walls 18, 18' of the cassette holder 14, which rollers engage slots 40, 40' and 41, 41' respectively, which serve as link-motion surfaces and which are formed in the side walls 36, 36' of the bracket 29. The slots of the link-motion devices 37, 37' are constructed so that when the bracket is moved between its rest position and its operating position it moves both transversely of the major walls of the inserted cassette and in the direction of the insertion path of the cassette. As a result of this, the bracket can perform a translational movement along with the cassette when the latter is inserted, the reel-hub hold-down means being moved gently towards the reel hubs with a steady and uniform movement. The translational actuating movement which is directed towards the cassette is simply obtained in that the slots 41, 41' have portions which are inclined relative to the direction of the insertion path of the cassette. Obviously, the slots 40, 40' may also have portions which are inclined relative to the direction of the insertion path.

For the movement of the bracket 29, which serves as carrying member, the cassette holder is provided with two actuating members which are movable relative to said bracket and which are arranged mirror-symmetrically on the cassette holder 14. Each actuating member comprises a plate-shaped slide 42, 42', which are each guided on the cassette holder 14 so as to be movable in the direction of the insertion path 22 of the cassette 1 by means of two rollers 44, 44' and 45, 45' which are rotatably mounted on the side walls 18, 18' of the cassette holder 14 and which project through guide slots 43, 43' in the slides 42, 42'. Each slide 42, 42' extends to the cassette insertion-path with an angular tab 46, 46', the cassette abutting with the tabs 46, 46' when it is inserted and driving the slides 42, 42' in the direction of the insertion path against the force of a return spring 47, 47' acting on each slide. The slides and the cassette then perform a similar linear sliding movement, so that no relative movement occurs between the slides and the cassette, which ensures a gentle co-operation between the slides and the cassette.

Each slide comprises an actuating stop 48, 48', formed by an end surface of its tab 46, 46', for the force-sustained co-operation with a complementary stop 49, 49' formed by an end surface of each side wall 36, 36' of the bracket 29. As is shown in FIG. 3, when the bracket is in its rest position the actuating stop 48, 48' is spaced from the complementary stop 49, 49'. Upon insertion of the cassette, after a first partial travel of the slide which is taken along by the cassette, the actuating surfaces 48, 48' abut with the complementary surfaces 49, 49' and subsequently, as the slides 42, 42' continue their travel, the actuating surfaces 48, 48' move the bracket 29 from its rest position into its operating position via the complementary surfaces 49, 49', the reel-hub hold-down means then being moved towards the reel hubs. This is already effected when the cassette holder is still in its loading position, as can be seen in FIG. 4, so that the reel-hub hold-down means are already moved towards the reel hubs when the cassette holder is in its loading position and can thus co-operate with said means. Thus, when the cassette holder is moved to its operating position it is not necessary to impart an additional actuating movement to this holder in order to bring the reel-hub hold-down means towards the reel hubs. In this way the desired result is obtained with a small actuating movement for the cassette holder, so that the dimensions of the apparatus can be small.

In order to simply preclude an inadvertent actuation of the bracket 29, each slide 42, 42' comprises a stop surface 50, 50', which extends in the direction of the insertion path of the cassette and consequently in the actuating direction of the slide and which is formed by an end face of said slide and the bracket 29 comprises a latching stop 51, 51' which extends transversely of the stop surface 50, 50'' the latching stop 51, 51' being formed by a lateral surface of a projections 52, 52' which is inclined relative to the side wall 36, 36 ' of the bracket 29. When the bracket 29 is in the rest position the latching stops 51, 51' are disposed opposite the stop surfaces 50, 50' on the slides 42, 42' and thereby prevent the bracket from being moved from its rest position to its operating position. In this way the rest position of the bracket 29 is defined. When the cassette is inserted into the cassette holder the slides 42, 42' are moved along and after the first partial travel of the slide, during which the actuating stops 48, 48' of the slides abut with the complementary stops 49, 49' on the bracket 29, the stop surfaces 50, 50' of the slides release the latching stops 51, 51' on the bracket, thereby permitting the bracket to move from its rest position into its operating position. However, this movement is possible only if a cassette is inserted into the cassette holder and thereby actuates the slide, so that the bracket cannot inadvertently be moved into the path of insertion of the cassette.

In order to move the bracket from its operating position into its rest position in a simple manner and without separate means upon removal of the cassette 1 from the cassette holder 14, each slide 42, 42' comprises an return engagement surface 53, 53' which extends transversely of the direction of the insertion path of the cassette and consequently transversely of the direction of movement of the slide and is formed by a further end face of the slide, and the bracket 29 comprises an return portion 54, 54' which extends transversely of the actuating surface and in the present case is formed by a rounded end surface of the angular projection 52, 52' on the side wall 36, 36' of the bracket. As can be seen in FIG. 4, when the bracket 29 is in its operating position the actuating surfaces 53, 53' of the slides 42, 42', engage with the return portions 54, 54' under the influence of the return spring 47, 47'. When the slides 42, 42' are moved in a direction opposite to the direction of insertion by the return springs 47, 47' acting on them and when the bracket is still out of its rest position upon removal of the cassette from the cassette holder, the return engagement surfaces 53, 53' remain in engagement with the return portions 54, 54' under the influence of the return spring 47, 47', the slides which have been moved by the return springs, moving said bracket from its operating position to its rest position via their return portions and the return engagement stops of the bracket. The actuating movement of the bracket is obviously defined again by the link-motion devices 37, 37', the translational actuating movement in a direction away from the cassette ensuring a smooth disengagement of the reel-hub hold-down means from the reel hubs. When the bracket has reached the rest position the return portions of the bracket are outside the path of the slides, as is shown in FIG. 3, and the return portions 54, 54' of the bracket 29 release the return engagement surfaces 53, 53' of the slides 42, 42' to enable a further movement by the return springs for the ejection of the cassette from the cassette holder. As a result of this further movement of the slides the cassette is ejected particularly far from the cassette holder, so that the cassette can readily be gripped and removed from the cassette holder. The slides 42, 42' can be moved so far by the return springs 47, 47' that the relevant ends of the guide slots 43, 43' in the slides engage with the rollers 44, 44'. The stop surfaces 50, 50' of the slides 42, 42' are then again disposed opposite the latching stops 51, 51' of the bracket 29 and, as already stated, thus retain the bracket in its rest position, as is shown in FIG. 3.

As is apparent from the foregoing the latching stops 51, 51' and the return portion 54, 54' the bracket 29 are together formed on a projection 52, 52' of the bracket and the stop surfaces 50, 50' and the return engagement surfaces 53, 53' of the slides 42, 42' are formed by two mutually perpendicular end surfaces of the plate-shaped slides. This construction is very simple and compact.

In order to retain the parts which have been actuated upon insertion of the cassette into the cassette holder in their actuated positions, there are provided two latching device 55, 55' which can be released by the actuation of a release element, which after the bracket 29, which serves as carrying member, has been moved from its rest position to its operating position upon insertion of the cassette into the cassette holder retain at least the slides 42, 42', which serve as actuating members and which are moved along upon insertion of the cassette, in their actuated positions against the force of the return springs 47, 47', and upon release of said devices by actuation of the release elements allow the bracket 29 to be set to its rest position and the slides 42, 42' to be actuated by the return springs in order to eject the cassette from the cassette holder. In the present case the two latching devices 55, 55' act on the bracket 29 and retain it in its operating position, the slides 42, 42' being retained in their actuated positions against the force of a return spring via the bracket which is retained in its operating position by the two latching devices.

The two latching devices 55, 55' each comprise a latching pin 56, 56' which is movable transversely of the direction of the insertion path of the cassette 1 in the cassette holder 14. The latching pins are arranged on a latching slide 57 which is guided on the strip 19 of the cassette holder 14 so as to be slidable transversely of the direction of insertion. For the frictional engagement there may be provided a plate spring, not shown, which acts between the latching slide 57 and the strip 19 and urges in the two parts frictionally against each other. The latching pins 56, 56' each project into a closed substantially heartshaped link-motion groove 58, 58' formed in a block 59, 59' which is secured to the transverse wall 30 of the bracket 29, as is shown in FIG. 5. During insertion of the cassette, when the bracket is moved in the direction of insertion by the cassette via the slides 42, 42' which is achieved by means of the link-motion devices, the link-motion paths of the groove 58, 58' automatically guide the latching pins 56, 56' from initial positions disposed near the apexes 60, 60' of the link-motion paths into latched positions near the indentations 61, 61' of the link motion paths, the bounding walls of the link-motion paths which extend transversely of the direction of insertion limiting the insertion movement of the cassette. In the latched position of the latching pins 56, 56' shown in FIG. 5, these pins retain the bracket 29 and the slides 42, 42', which are moved along upon insertion of the cassette, in their actuated positions against the force of the return springs 47, 47' via the link-motion paths. This ensures that the bracket 29 is retained in its operating position, thereby guaranteeing correct co-operation of the reel-hub hold-down means 28, 28' on the bracket 29 with the reel hubs 4, 4'. The construction of the latching devices is very simple and reliable. Releasing these latching devices 55, 55' is effected in a particularly simple manner. As already stated, the bracket is also movable in the direction of the insertion path of the cassette. This is utilized for releasing the latching devices. When the bracket 29, which serves as carrying member, is moved further out of its operating position in the direction of the insertion path of the cassette, the latching devices are released automatically. This further movement of the bracket is simply achieved by a further movement of the cassette 1, which forms the release element, in the direction of the insertion path. Thus, a separate release element is not required. In order to release the latching devices 55, 55' the latching pins 56, 56', are automatically moved out of their latched positions shown in FIG. 5 by the link-motion paths 58, 58' themselves when the bracket is moved further out of its operating position in the direction of the insertion path of the cassette, the link-motion paths 58, 58' returning the latching pins 56, 56', which have been moved out of their latched positions, to their initial positions near the apexes 60, 60' after the latching devices 55, 55' have been moved in a direction opposite to the direction of insertion by the return springs 47, 47' during the movement of the bracket 29. As a result of the presence of the latching devices 55, 55' it is achieved that when the cassette holder contains a cassette the force of the return springs is taken up by the latching devices, so that the return springs do not act on the inserted cassette itself. This is of advantage because it guarantees an unimpeded positioning of the cassette in its operation position when the cassette holder is in its operating position and because the returns rings cannot exert any undesired force on the reel-hub hold-down means.

As already stated, the cassette 1 comprises a two-part cassette closure 9 which is movable against the force of a closing spring 10. Upon insertion of the cassette into the cassette holder 14 of the apparatus 13 the cassette, as already stated, buts against tabs 46, 46' of the slide 42, 42', which tabs probject into the insertion path of the cassette. The tabs 46, 46' of the slides 42, 42' then co-operate with the closure slide 11 of the cassette closure 9. As a result of this, the tabs 46, 46' initially retain the slide 11 when the cassette is inserted into the cassette holder so that upon a further insertion of the cassette the slide 11 is slid relative to the cassette housing 3 out of the closed position into its open position, which is effected against the action of the closing spring 10. The tabs 46, 46' of the slides 42, 42', which serve as actuating members, are not moved along by the cassette via the closure slide 11 until the slide 11 has reached its open position, which is schematically represented by the dash-dot lines in FIGS. 4 and 5, and can no longer be moved relative to the cassette holder, and subsequently the slides 42, 42' are actuated and the bracket 29 is moved from its rest position to its operating position, as explained in the foregoing.

Since the slide 11 of the cassette closure 9 is retained in its open position against the force of the closing spring 10 when the cassette holder 14 contains a cassette 1, the closing spring 10 for the cassette closure 9 exerts a force on the cassette which is opposed to the direction of the insertion path. In order to take up this force a retaining device, for retaining the cassette 1 which is contained in the cassette holder in its loading position and which is urged in a direction opposite to the direction of the insertion path by the closing spring 10, is arranged on the movable bracket 29 which serves as carrying member for the reel-hub hold-down means 28, 28'. The retaining device is simply constituted by a pin 62 which is secured to the transverse wall 30 of the bracket 29, which extends perpendicularly to the major wall of the inserted cassette, and which co-operates with the cassette 1 and engages an opening 63 formed in the major wall 5 of the cassette 1 after the movement of the bracket from its rest position to its operating position. In the major wall 6 of the cassette 1 an opening 64 corresponding to the opening 63 is formed, which opening co-operates with the pin 62, which acts as retaining device, upon reversal of the cassette. By means of the retaining device the cassette is retained in the cassette holder against the force of the closing spring 10 of the cassette closure 9, thereby preventing the closure spring from pressing the cassette against the reel-hub hold-down means, which have already been moved towards the reel hubs.

Upon insertion of the cassette into the cassette holder 14, already stated, the closure slide 11 is set to its open position, after which the cassette, via the open slide 11, moves the slides 42, 42', which function as actuating members, via their tabs 46, 46' which extend into the insertion path. After the first partial travel of the slides 42, 42' the actuating surfaces 48, 48' engage with the complementary surfaces 49, 49' and the stop surfaces 50, 50' of the slides release the bracket 29. Subsequently, the bracket 29 is moved from its rest position to its operating position by the slides 42, 42', the link-motion devices 37, 37' defining the movement of the bracket which is directed transversely of the major walls of the inserted cassette and in the same direction as the insertion path of the cassette. During this movement the latching pins 56, 56' of the latching devices 55, 55' are moved from their initial positions to their latched positions, in which they latch the bracket 29 in its operating position and the slides 42, 42' in their actuated positions, the latching devices 55, 55' taking up the force exerted by the return springs 47, 47'. In the operating position of the bracket the pin 62, which serves as a retaining device, engages the opening 63 in the cassette and retains the cassette against the action of the closing spring 10 for the cassette closure 9, whilst at the same time the abutment surfaces 34, 34' of the reel-hub hold-down means 28, 28' abut with the end faces 35, 35' of the reel hubs 4, 4'. When the cassette holder is still in its loading position the reel-hub hold down means are already in their operating positions on the reel-hubs, as is shown in FIGS. 4 and 5. During the movement of the cassette holder from its loading position to its operating position the closing flap 12 of the cassette abuts with two schematically shown stops 65, 65', so that the flap is pivoted into an open position shown in FIG. 6. When the cassette holder 14 is in its operating position, as already stated, the cassette 1 is positioned in its operating position. As is shown in FIG. 6, the end faces 26, 26' of the reel hubs 4, 4', which end faces are disposed near the major wall 6, engage with the abutment surfaces 25, 25' of the reel hubs 24, 24' and the abutment surfaces 34, 34' of the reel-hub hold-down means 28, 28' engage with those end faces 35, 35' of the reel hubs 4, 4' which are disposed near the major wall 5 under the influence of their plate springs 32, 32', so that the positions of the reel hubs are defined exactly by the winding mandrels in conjunction with the reel-hub hold-down means. The actuating movement of the cassette holder from its loading position to its operating position only serves for moving the cassette to its operating position, without requiring an additional actuating movement to make the reel-hub hold-down means engage with the reel hubs, because the reel-hub hold-down means already have been moved towards the reel hubs when the cassette holder is in its loading position. Consequently, the desired result is obtained with a small displacement of the cassette holder, so that in the apparatus a minimal space is required for this purpose. This is of advantage in order to minimize the dimensions of the apparatus.

For the removal of the cassette 1 from the apparatus, the cassette holder is first removed from the operating position to the loading position, during which the closing flap returns to its closed position. If the cassette is now further moved in the direction of the insertion path when pressure is exerted on the cassette, the latching devices 55, 55' are automatically released and the slides move the bracket 29 from its operating position to its rest position under the influence of the force exerted by the return springs via the return engagement surfaces 53, 53' and the return portions 54, 54' of said bracket, the tabs 46, 46' of the slides 42, 42' moving the cassette out of the cassette holder. The slide 11 of the cassette closure 9 is now also returned to its closed position by the closing spring 10.

FIGS. 7 to 9 schematically show a part of a recording and/or reproducing apparatus 66 for a cassette 67, which comprises only one flanged reel-hub 68 for taking up a record carrier 69 in the form of a tape, which when the cassette 67 is in its operating position on the apparatus can be led through an opening 70 in a side wall of the cassette in order to be scanned by scanning elements via which it is fed to a take-up reel on the apparatus. The reel hub 68 in the cassette 67 is also axially accessible via two parallel major walls 71 and 72 of the cassette 67, namely through openings in the major walls of the cassette, which openings are concentric with the reel hub 68. For driving the reel hub the apparatus comprises a rotatable winding mandrel 73, whose abutment surface 74 co-operates with the surface 75 of the reel hub which is disposed near the major wall 72, when the cassette is in the operating position shown in FIG. 8.

In the same way as in the embodiment of the apparatus shown in FIGS. 3 to 6 the apparatus 66 comprises a movably guided box-shaped cassette holder 76, comprising a bottom wall 77, a top wall 78, and two side walls 79 and 80. The cassette holder is movable between a loading position, shown in FIG. 7, in which the cassette 67 can be inserted into the cassette holder 67 up to a limiting stop 82 with its major walls 71 and 72 parallel to a predetermined insertion path indicated by a dash-dot arrow 81, and an operating position, shown in FIG. 8, in which the inserted cassette occupies its operating position in the apparatus and the reel hub 68 co-operates with the winding mandrel 73 on the apparatus through the bottom wall 67 and the major wall 72 which faces the winding mandrel. In the operating position of the cassette holder the top wall 78 of the cassette holder 76 closes an opening 83, through which the cassette holder moves between its loading position and its operating position. The walls 77, 78, 79 and 80 of the cassette holder 76 substantially adjoin the relevant walls of the cassette 67. Consequently, the cassette holder has the same small dimensions as the cassette, so that it occupies a minimal space. This is of advantage in order to minimize the dimensions of the apparatus.

The cassette holder 76 comprises a reel-hub hold-down means 84, which simply comprises a thrust member 86 arranged on a plate spring 85, which member can co-operate with the reel hub 78 through that major wall 71 of the cassette 67 which is remote from the winding mandrel 73 and maintains the reel hub 68 in a predetermined position relative to the winding mandrel 73 when the cassette 67 is in its operating position. As is shown in FIG. 8, the thrust member 86, which is loaded by the plate spring 85 of the reel-hub hold-down means 84, then engages with a concentric projection 87 of an end face 88 of the reel hub 68 disposed near the major wall 71.

The reel-hub hold-down means 84 is arranged on a carrying member which is situated on the cassette holder 76 and which has a portion which carries the reel-hub hold-down means and which extends substantially parallel to the major walls 71 and 72 of the inserted cassette. The carrying member is arranged on the cassette holder 76 so as to be movable substantially transversely of the major wall of the inserted cassette between a rest position, shown in FIG. 7, in which the reel-hub hold-down means 84 is disposed outside the insertion path of the cassette, and an operating position, in which the reel-hub hold-down means 84 engages with the reel hub 68. The carrying member simply comprises an angular lever 90, which is pivotable about a pivotal axis 89 which extends parallel to the major walls of the inserted cassette and perpendicularly to the insertion path of the cassette, the two lever arms 91 and 92 being perpendicular to each other. One arm 91, which extends substantially parallel to the major walls 71 and 72 of the inserted cassette 67, carries the reel-hub hold-down means 84, the plate spring 85 of the reel-hub hold-down means being connected to the arm 91. The arm 91 and the reel-hub hold-down means 84 arranged on it are substantially disposed in an opening 93 in the top wall 78 of the cassette holder 76. Via the other arm 92 the angular lever 90, with its arm 91 carrying the reel-hub hold-down means 84, can be moved substantially transversely of the major walls of the inserted cassette 67 by means of an actuating member for the angular lever 90 which serves as carrying member, the arm 91 moving through the opening 93 in the top wall 78. In the present case the actuating member is simply combined to form a single component with the carrying member formed by the angular lever, the actuating member comprising an actuating pin 94 mounted in the arm 92 of the angular lever 90. The actuating pin projects into the insertion path of the cassette 67, the cassette, as it is inserted, moving the actuating pin 94 against the force of a return spring 95 and thereby moving the angular lever 90 from its rest position to its operating position. The return spring 95 is formed by a wire spring secured to the cassette holder 76, which spring acts on a stop 96 on the cassette holder and on the arm 92 of the angular lever 90 and consequently tends to keep the arm 92 of the angular lever 90 in engagement with a limiting stop 97. As is shown in FIG. 7 this limiting stop 97 defines the rest position of the angular lever 90 used as carrying member for the reel-hub hold-down means 84.

In order to retain the angular lever 90 in its operating position, there is provided a latching device on the cassette holder, which device is formed by a pivotal spring-loaded latching pawl 98. When the angular lever 90 is in its rest position the hook-shaped end 100 of the latching pawl 98 is urged against the angular lever 90 under the influence of the spring 99 which acts on said pawl. When the angular lever 90 has been moved to its operating position after insertion of the cassette 67, the latching pawl 98 is latched under the influence of the spring 99 and retains the angular lever 90 via its arm 92, as is shown in FIGS. 8 and 9. In order to release the latching device constituted by the latching pawl 98 a push-button 102 is arranged on the cassette holder as release element, which push-button is movable against the force of a fork-shaped plate spring 101, the push-button rod 103 of said button having an inclined surface 104. When the push-button is depressed when the latching pawl is in the latched position, the latching pawl 98 is pivoted so far via the inclined portion 104 of the push-button rod 103 that the arm 92 of the angular lever is released by the hook-shaped end 100 of the latching pawl 98 and the return spring 95 can again move the angular lever 90 to its rest position. During this movement of the angular lever from its operating position to its rest position the actuating pin 94 slightly ejects the cassette 67 from the cassette holder, so that it can be taken out of the cassette holder. In the apparatus 66 there is provided a latching stop 105 which, when the cassette holder is in its operating position, is disposed opposite the free end of the push-button rod 103 of the push-button 102 and thus blocks the push-button when the cassette holder is in its operating position, so that inadvertent actuation is precluded.

As the reel-hub hold-down means when the angular lever is in its rest position is disposed outside the insertion path of the cassette and consequently outside the holder compartment bounded by the walls of the box-shaped cassette holder, the upper wall and the lower wall of the cassette holder can be closer to each other, taking into account the dimensions of the cassette, which minimizes dimensions of the cassette holder and thus the space required by the cassette holder. The reel-hub hold-down means is already set to its operating position during insertion of the cassette, i.e. when the cassette holder is still in its loading position, so that no separate actuating movement of the cassette holder is required for moving it from its loading position to its operating position in order to bring the reel-hub hold-down means into engagement with the reel hub, which reduces the space required for the movement of the cassette holder. As a result of the minimal space occupied by the cassette holder, the dimensions of the apparatus can be minimized.

In the foregoing two embodiments of the apparatus in accordance with the invention have been described. Obviously, further embodiments are possible. For example, a bracket which serves as carrying member may be combined to one component with at least one actuating member. Such a bracket may also be movable via link-motion devices whose slots are formed in the cassette holder and whose rollers, which engage in the slots, are arranged on the bracket. Moreover, such a bracket may be pivotable about only one fixed pivotal axis. Instead of slides it is possible to use pivotal levers as actuating members. As regards the latching devices there are also several possibilities; for example, so-called shadow latches may be used as automatically releasing latching devices arranged between the slides which serve as actuating members and the cassette holder. The latching pins of the latching devices in the first embodiment may be arranged on the bracket and the link-motion slots may be formed in the cassette holder. As retaining device a strip may be arranged on the bracket, which strip engages behind the cassette after it has been inserted. An angular lever used as carrying member may for example be arranged so as to be pivotable about a pivotal axis which extends in the direction of the insertion path. Obviously, a pivotable cassette holder may be used, which can be pivoted between its loading position and its operating position.

What is claimed is:

1. A tape cassette recording and/or reproducing apparatus for use with a cassette having two mutually parallel major cassette walls, at least one rotatable reel hub disposed within the cassette and axially accessible through openings in each of said walls, and a length of tape arranged within the cassette for winding on said reel hub, said apparatus comprising a cassette holder movable between a loading position which defines a cassette insertion path, arranged such that a cassette having its major walls aligned parallel to the path can be inserted into the holder along said path, and an operating position in which an inserted cassette occupies an operating position, a rotatable winding mandrel arranged to engage said reel hub of a cassette, which has been inserted and is in the operating position, through one of the major walls of said cassette, the other of said major walls being remote from the winding mandrel, a carrying member disposed on the cassette holder and having a portion extending substantially parallel to the major walls of an inserted cassette, and reel-hub hold-down means arranged on said carrying member adjacent said other major wall for cooperating with said reel hub through said other major wall to hold the reel hub in a predetermined position relative to the winding mandrel when the cassette is in the operating position, characterized in that said carrying member and portion are arranged on the cassette holder to be movable, at least transversely of the major walls of an inserted cassette, between a rest position in which said means is disposed outside the insertion path, and an operating position in which said means engages the reel hub, the cassette holder comprises at least one actuating member movably mounted thereon and projecting into the insertion path, and means for movably mounting the actuating member to the cassette holder arranged such that, during movement of a cassette being inserted along the insertion path, the cassette engages and moves the actuating member in an insertion direction, the apparatus comprises means for moving the carrying member from its rest position to its operating position in response to movement of said actuating member in said insertion direction, the apparatus further comprises a return spring having an end, and means for connecting said end to said actuating member for exerting a biasing force against said actuating member opposing movement in said insertion direction, and said reel-hub hold-down means is arranged on the carrying member so as to be adjacent said reel hub of a cassette being inserted when the cassette engages the actuating member.

2. An apparatus as claimed in claim 1, characterized in that the actuating member comprises a slide, having an actuating surface, and arranged on the cassette holder so as to be movable in said insertion path direction against the force of said return spring, said carrier member comprises a complementary surface arranged to be spaced from said actuating surface when the carrier member is in a rest position, the actuating surface being arranged to butt against, in a force sustaining manner, the complementary surface upon insertion of a cassette after a first partial travel of the slide; and as the slide moves further, to set the carrying member from its rest position to its operating position.

3. An apparatus as claimed in claim 2, characterized in that the slide has a return engagement surface extending transversely of the insertion path direction, and said carrying member comprises a return portion arranged to extend transversely of the return engagement surface, said return portion is kept in engagement with the return engagement surface by the return spring during movement of the carrying member from its operating position towards its rest position when the return spring moves the slide in a direction opposite the direction of insertion, during removal of the cassette from the holder said carrying member being in its rest position, and the carrying member return portion being released from the return engagement surface to permit the slide to be moved further by the return spring.

4. An apparatus as claimed in claim 2, characterized in that the slide has a stop surface which extends in the direction of the insertion path, the carrying member comprises a latching stop extending transversely of said stop surface, arranged to be disposed opposite the stop surface when the carrying member is in its rest position so as to block movement of the carrying member to its operating position, and the apparatus includes means for releasing the latching stop during insertion of the cassette, after the first partial travel of the slide, to allow the carrying member to be moved from its rest position to its operating position, said stop surface being part of said means for releasing.

5. An apparatus as claimed in claim 4, characterized in that the slide has a return engagement surface extending transversely of the insertion path direction, and said carrying member comprises a return portion stop arranged to extend transversely of the return engagement surface, said return portion is kept in engagement with the return engagement surface by the return spring during movement of the carrying member from its operating position towards its rest position when the return spring moves the slide in a direction opposite the direction of insertion, during removal of the cassette from the holder said carrying member being in its rest position, and the carrying member return portion being released from the return engagement surface to permit the slide to be moved further by the return spring.

6. An apparatus as claimed in claim 5, characterized in that the carrying member includes a projection on which the latching stop and the carrying member actuating surface are arranged, and in that said slide is plate-shaped and has two end faces extending substantially perpendicularly to each other, said end faces forming the slide stop surface and return engagement surface.

7. An apparatus as claimed in claim 1, characterized in that the actuating member and carrying member are parts of a single component.

8. An apparatus as claimed in claim 1, characterized in that the apparatus further comprises at least one latching device and means for releasing said at least one latching device; after the carrying member has moved from its rest position to its operating position during insertion of the cassette, said latching device retains at least the carrying member in the operating position; and after release, said latching device allows the carrying member to be moved to its rest position and the actuating member to be moved by the return spring so as to permit removal of an inserted cassette from the cassette holder.

9. An apparatus as claimed in claim 8, characterized in that the latching device is arranged to act directly on and retain the carrying member in its operating position, the actuating member being retained in its actuated position against the force of the return spring exerted through the carrying member.

10. An apparatus as claimed in claim 8, characterized in that the carrying member and latching device are so arranged that, upon movement of the carrying member further out of its operating position in the direction of the insertion path of the cassette, as a result of a further movement of the cassette in the direction of the insertion path, the latching device is released, the cassette thereby functioning as part of the release means.

11. An apparatus as claimed in claim 10, characterized in that the latching device comprises a latching pin arranged to be movable transversely of the direction of insertion of the cassette, the carrying member includes means defining a substantially heart-shaped link-motion groove into which the latching pin projects, during insertion of the cassette and the resulting movement of the carrying member in the direction of the insertion path the groove guides the latching pin on a link motion path from an initial position at the location of the heart apex to a latched position near the indentation of the heart, in which latched position the latching pin retains the actuating member in its actuated position against the force of the return spring, the latching pin being movable along the link-motion path transversely of the cassette insertion direction in order to release the latching device, by movement of the carrying member further out of its operating position in the direction of the insertion path of the cassette, the link-motion path guiding the latching pin back to its initial position after the latching device has been released upon movement of the carrying member in a direction opposite the insertion path direction by the return spring.

12. An apparatus as claimed in claim 1, characterized in that the carrying member comprises an angular lever pivotable about a pivotal axis extending parallel to the major walls of an inserted cassette, one arm of said lever extending substantially parallel to the major walls and supporting the reel-hub hold-down means, the lever having an outer lever arm engagable by the actuating member to move the lever substantially transversely of the major wall.

13. An apparatus as claimed in claim 1, characterized in that the carrying member comprises a U-shaped bracket, as viewed along the insertion path of the cassette, having a transverse wall which extends substantially parallel to the major walls of the inserted cassette, and two side walls perpendicular to the transverse wall; and the bracket carries the reel-hub hold-down means and is mounted on the cassette holder so as to be movable at least transversely of the major walls of the inserted cassette as a result of coupling via said two side walls.

14. An apparatus as claimed in claim 13, characterized in that the apparatus further comprises a link-motion device arranged between the cassette holder and each side wall of said bracket, for mounting the bracket on the cassette holder so as to be movable; said link motion device comprising at least one link-motion surface having a portion inclined relative to the direction of insertion of the cassette, said link-motion surface being arranged additionally to move the bracket relative to the cassette holder in the direction of the insertion path of the cassette.

15. An apparatus as claimed in claim 14, characterized in that the latching device is arranged to act directly on and retain the carrying member in its operating position, the actuating member being retained in its actuated position against the force of the return spring exerted through the carrying member, and the carrying member and latching device are so arranged that, upon movement of the carrying member further out of its operating position in the direction of the insertion path of the cassette, as a result of a further movement of the cassette in the direction of the insertion path, the latching device is released, the cassette thereby functioning as part of the release means.

16. An apparatus as claimed in claim 15, characterized in that the latching device comprises a latching pin arranged to be movable transversely of the direction of insertion of the cassette, the carrying member includes means defining a substantially heart-shaped link-motion groove into which the latching pin projects, during insertion of the cassette and the resulting movement of the carrying member in the direction of the insertion path the groove guides the latching pin on a link motion path from an initial position at the location of the heart apex to a latched position near the indentation of the heart, in which latched position the latching pin retains the actuating member in its actuated position against the force of the return spring, the latching pin being movable along the link-motion path transversely of the cassette insertion direction in order to release the latching device, by movement of the carrying member further out of its operating position in the direction of the insertion path of the cassette, the link-motion path guiding the latching pin back to its initial position after the latching device has been released upon movement of the carrying member in a direction opposite the insertion path direction by the return spring.

17. An apparatus as claimed in claim 1, adapted for use with a cassette having a cassette closure which can be moved against the force of a closing spring upon insertion of the cassette into the cassette holder, characterized in that the carrying member further includes a retaining device for retaining a cassette which has been inserted into the cassette holder when the holder is in the loading position, said closure being urged in a direction opposite the direction of the insertion path by the closing spring.

18. An apparatus as claimed in claim 17, characterized in that the retaining device comprises at least one pin which is secured to the carrying member and extends perpendicular to the major walls of an inserted cassette, said pin engaging the cassette when the carrying member is moved from its rest position to its operating position.

* * * * *